(12) United States Patent
Kouno et al.

(10) Patent No.: US 9,994,073 B2
(45) Date of Patent: Jun. 12, 2018

(54) TIRE

(71) Applicant: BRIDGESTONE CORPORATION, Chuo-ku, Tokyo (JP)

(72) Inventors: Yoshihide Kouno, Tokyo (JP); Seiji Kon, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 284 days.

(21) Appl. No.: 14/903,062

(22) PCT Filed: Jun. 30, 2014

(86) PCT No.: PCT/JP2014/067455
§ 371 (c)(1),
(2) Date: Jan. 6, 2016

(87) PCT Pub. No.: WO2015/005172
PCT Pub. Date: Jan. 15, 2015

(65) Prior Publication Data
US 2016/0137000 A1 May 19, 2016

(30) Foreign Application Priority Data

Jul. 12, 2013 (JP) .................................. 2013-146822

(51) Int. Cl.
*B60C 5/01* (2006.01)
*B60C 9/00* (2006.01)
(Continued)

(52) U.S. Cl.
CPC ................ *B60C 9/00* (2013.01); *B60C 5/007* (2013.01); *B60C 5/01* (2013.01); *B60C 9/023* (2013.01);
(Continued)

(58) Field of Classification Search
CPC .... B60C 5/00; B60C 5/01; B60C 9/00; B60C 9/02; B60C 9/14
See application file for complete search history.

(56) References Cited

U.S. PATENT DOCUMENTS 4,277,295 A  7/1981 Schmidt et al.
4,399,851 A * 8/1983 Bschorr .................. B60C 19/00
                                                             152/156
2006/0254691 A1  11/2006 Noto et al.

FOREIGN PATENT DOCUMENTS

EP  1615783 A1  1/2006
EP  2399761 A1  12/2011
(Continued)

OTHER PUBLICATIONS

Communication pursuant to Article 94(3) EPC dated Jun. 20, 2017, issued in the corresponding European Patent Application No. 14823607.8.

*Primary Examiner* — Justin R Fischer
(74) *Attorney, Agent, or Firm* — Solaris Intellectual Property Group, PLLC (57) ABSTRACT

A tire includes: a ring shaped tire frame member that is made of a resin with plural tire pieces joined along a tire circumferential direction; a joint portion reinforcing belt that is adhered to the tire frame member, that extends around the tire circumferential direction, and that covers a joint portion of the plural tire pieces; and a tread layer that is provided further to the tire radial direction outside than the tire frame member and the joint portion reinforcing belt.

4 Claims, 5 Drawing Sheets

(51) Int. Cl.
  *B60C 9/02* (2006.01)
  *B60C 9/18* (2006.01)
  *B60C 15/00* (2006.01)
  *B60C 11/00* (2006.01)
  *B60C 5/00* (2006.01)
  *B60C 7/00* (2006.01)

(52) U.S. Cl.
  CPC .............. *B60C 9/0207* (2013.01); *B60C 9/18* (2013.01); *B60C 11/00* (2013.01); *B60C 15/0027* (2013.01); *B60C 15/0054* (2013.01); *B60C 15/0018* (2013.01); *B60C 2007/005* (2013.01); *B60C 2009/0215* (2013.01); *B60C 2009/1892* (2013.01)

(56) References Cited

FOREIGN PATENT DOCUMENTS

| GB | 789770 | * | 1/1958 |
|----|--------|---|--------|
| GB | 1075644 | * | 7/1967 |
| JP | S55-39398 A | | 3/1980 |
| JP | H3-143701 A | | 6/1991 |
| JP | H05-116504 A | | 5/1993 |
| JP | 2005-254993 A | | 9/2005 |
| JP | 2006-514589 A | | 5/2006 |
| JP | 2010-58717 A | | 3/2010 |
| JP | 2011-207165 A | | 10/2011 |

* cited by examiner

TIRE

TECHNICAL FIELD

The present invention relates to a tire in which a tire frame member is formed of a resin material.

BACKGROUND ART

Tires have been proposed in which a tire frame member is formed of a resin material, and a rubber tread layer is provided at the outer circumference of the tire frame member. Japanese Patent Application Laid-Open (JP-A) No. H03-143701 describes such a tire, in which a pair of tire pieces are joined together in the tire axial direction to form the tire frame member.

In the tire of Patent Document 1, a reinforcing cord is wound in a spiral shape around the tire circumferential direction to form a reinforcing layer, and the reinforcing layer is embedded inside a tread rubber to increase the rigidity of the tire.

SUMMARY OF INVENTION

Technical Problem

However, when the tire rides up over a protrusion on a road surface, for example, and a large external force is applied to the tire, a large amount of stress is concentrated at the joint portion of the tire frame member, and deformation of the tire frame member increases.

In consideration of the above circumstances, an object of the present invention is to increase the rigidity of a joint portion in a tire frame member that is formed by joining together tire pieces.

Solution to Problem

A tire according to a first aspect of the present invention includes: a ring shaped tire frame member that is made of a resin with plural tire pieces joined along a tire circumferential direction; a joint portion reinforcing belt that is adhered to the tire frame member, that extends around the tire circumferential direction, and that covers a joint portion of the tire pieces; and a tread layer that is provided at a tire radial direction outside of the tire frame member and the joint portion reinforcing belt.

Advantageous Effects of Invention

Due to the above configuration, the present invention enables the rigidity of the joint portion of the tire frame member to be increased.

DESCRIPTION OF EMBODIMENTS

First Exemplary Embodiment

Explanation follows regarding a tire 10 according to a first exemplary embodiment of the present invention, with reference to the drawings. Note that in the drawings, the arrow TW indicates a direction parallel to the rotation axis of the tire 10 (hereafter referred to as "tire axial direction" as appropriate), and the arrow TR indicates the radial direction that is orthogonal to the tire width direction and passes through the rotation axis of the tire 10 (hereafter referred to as "tire radial direction" as appropriate). The arrow TC indicates a circumferential direction of a circle about the rotation axis of the tire 10 (hereafter referred to as "tire circumferential direction" as appropriate).

Figure 1:
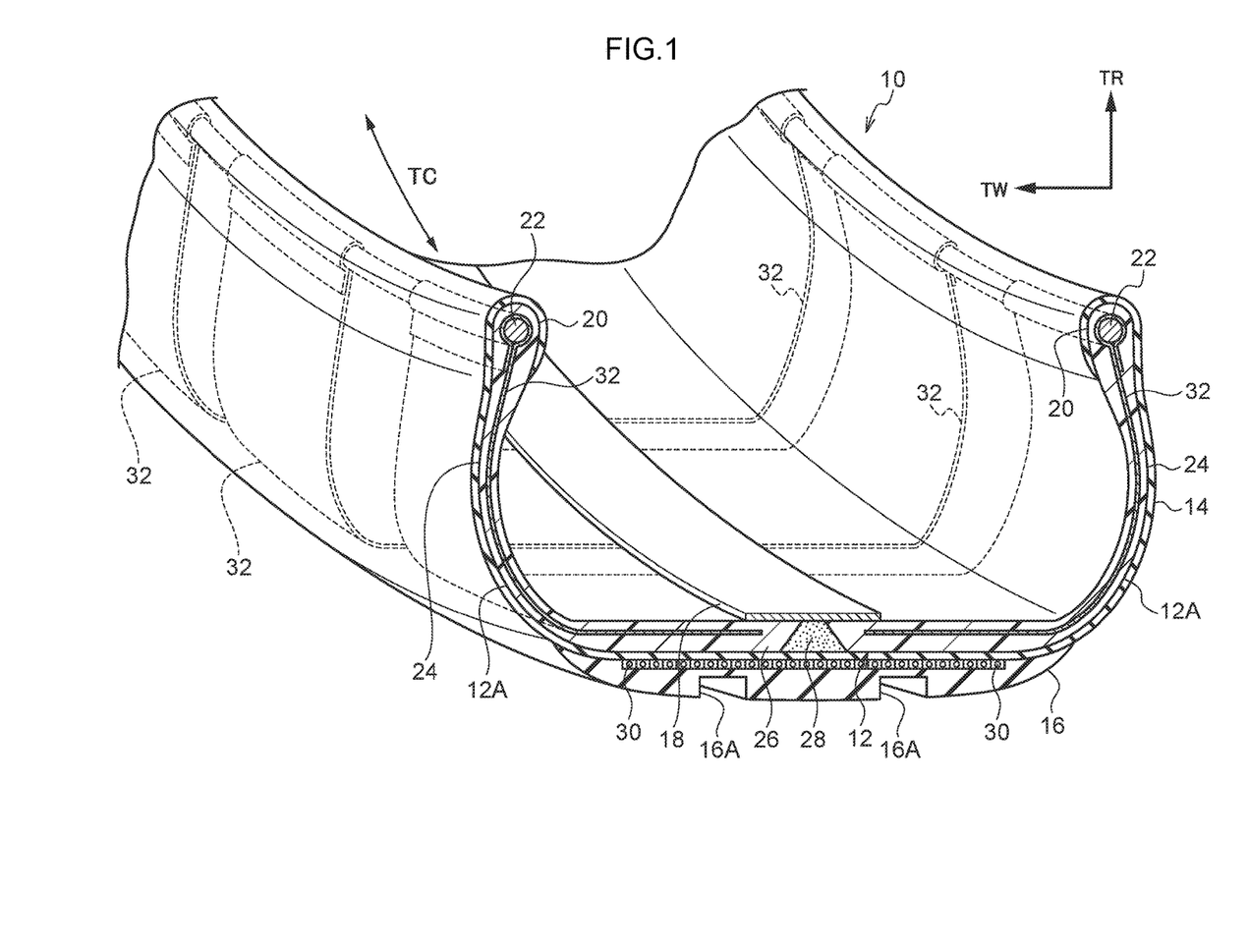
FIG. 1 is a perspective cross-section view illustrating a portion of a tire according to a first exemplary embodiment.

As illustrated in FIG. 1, the pneumatic tire 10 is made using a resin material, and is mainly configured including a tire frame member 12, a covering rubber layer 14, a tread rubber 16, and a reinforcing belt layer 18 serving as a joint portion reinforcing belt.

The tire frame member 12 is a resin member formed in a ring shape by joining plural tire pieces 12A together along the tire circumferential direction. The tire frame member 12 includes a pair of bead portions 20 disposed with an interval along the tire axial direction therebetween, a pair of side portions 24 that respectively extend out from the pair of bead portions 20 toward the tire radial direction outside, and a crown portion 26 that couples the pair of side portions 24 together. Note that a bead portion referred to herein extends from a tire radial direction inside end as far as 30% of the tire cross-section height. A portion at which tread rubber is disposed is referred to as a crown portion.

Note that a thermoplastic resin, a thermoplastic elastomer (TPE), a thermoset resin, or the like, which has equivalent elasticity to rubber, may be employed as the resin material configuring the tire frame member 12. In particular, a thermoplastic elastomer is preferably employed, in consideration of elasticity while travelling and moldability during manufacture. Note that the entire tire frame member 12 may be formed of the above resin material, or a portion of the tire frame member 12 may be formed of the above resin material.

Examples of a thermoplastic elastomer include thermoplastic amide-based elastomers (TPA), thermoplastic ester-based elastomers (TPC), thermoplastic olefin-based elastomers (TPO), thermoplastic styrene-based elastomers (TPS), thermoplastic urethane-based elastomers (TPU), thermoplastic cross-linked rubbers (TPV), or other thermoplastic elastomers (TPZ), as defined in JIS K6418. Examples of a thermoplastic resin include urethane resins, olefin resins, vinyl chloride resins, and polyamide resins.

A material that has, for example, a load deflection temperature (when applied with a load of 0.45 MPa) as defined in ISO75-2 or ASTM D648 of 78° C. or above, that has a tensile yield strength as defined in JIS K7113 of 10 MPa or above, that has a tensile yield point elongation as also defined in JIS K7113 of 10% or above, that has a tensile elongation at break as also defined in JIS K7113 of 50% or above, and that has Vicat softening temperature as defined in JIS K7206 (method A) of 130° C. or above, may be employed as this thermoplastic material.

A bead core 22 is embedded in each bead portion 20 of the tire frame member 12. Metal, organic fibers, organic fibers covered in a resin, a hard resin, or the like may be employed as the material of the bead cores 22. Note that the bead cores 22 may be omitted, as long as the rigidity of the bead portions 20 is secured, and there are no issues with fitting to a rim, not illustrated in the drawings.

Note that plural side reinforcing members 32 that intersect the tire circumferential direction on progression from the bead portion 20 toward the crown portion 26 are embedded in the tire frame member 12. Each side reinforcing member 32 is a belt shaped member in which a twisted cord, a monofilament, or a collective body of plural filaments is laminated using resin, and one end portion of the side reinforcing member 32 is wound around the bead core 22 and back on itself. Another end portion of the side reinforcing member 32 extends from the side portion 24 as far as the crown portion 26, and is positioned at a tire axial direction center portion of the tire frame member 12.

Plural side reinforcing members 32 are disposed at intervals around the tire circumferential direction, and in the present exemplary embodiment, 24 of the side reinforcing members 32 are disposed at equal intervals around a full turn of the tire 10. Note that in the present exemplary embodiment, each side reinforcing member 32 is formed in a rectangular shape; however, configuration is not limited thereto, and another shape, such as a fan shape, may be formed. Moreover, adjacent side reinforcing members 32 may be disposed partially overlapping each other, without providing intervals therebetween.

A resin joint member 28 is provided to the crown portion 26 of the tire frame member 12, between the pair of tire pieces 12A. The joint member 28 is formed in a substantially trapezoidal shape in cross-section view and the tire pieces 12A are joined to either side face of the joint member 28, such that the pair of tire pieces 12A are coupled together. Note that the same type, or a different type of thermoplastic material or melted resin as the tire pieces 12A may be employed as the joint member 28. Moreover, the tire pieces 12A may be coupled together without employing the joint member 28. In such cases, for example, a hot plate welding method in which a hot plate is wedged between end portions of the tire pieces 12A and the hot plate is removed while pressing both the end portions in a direction approaching each other so as to be welded together, or a method in which the tire pieces 12A are adhered to each other by adhesive, may be employed. These methods may also be combined.

A reinforcing cord 30 is wound around the crown portion 26 of the tire frame member 12, for example in a spiral shape. A steel cord, or a monofilament (single cord) of metal fibers, organic fibers, or the like may be employed as the cord 30. A multifilament (twisted cord) in which these fibers are twisted together may also be employed. Note that in cases in which a steel cord is employed as the cord 30, the cord 30 may be covered in resin in advance, and wound in a spiral around the tire circumferential direction while applying heat thereto. Heat may be applied to both the cord 30 and seating when this is performed.

Winding the reinforcing cord 30 in a spiral shape around the tire circumferential direction enables the rigidity of the crown portion 26 around the tire circumferential direction to be improved, and also enables the fracture resistance of the crown portion 26 to be improved. This also enables the puncture resistance of the crown portion 26 of the tire 10 to be increased. In cases in which the crown portion 26 is to be reinforced, the method of reinforcing by winding the cord 30 in a spiral shape around the tire circumferential direction is preferable due to ease of manufacturing. However, configuration is not limited thereto, and a method may be employed in which cords 30 are disposed intermittently around the tire width direction. Moreover, the tire frame member 12 may be reinforced by embedding another reinforcing material (fibers of a polymer material or a metal, cord, non-woven fabric, or woven fabric) in the tire frame member 12.

The covering rubber layer 14 is provided at an outer face of the tire frame member 12 formed as described above. The covering rubber layer 14 is formed continuously and of the same thickness, and employs a similar rubber to rubber employed in side walls and bead portions of conventional, general rubber pneumatic tires. The covering rubber layer 14 covers a tire radial direction outside face of the tire frame member 12, is folded back on itself at the bead portions 20, and extends as far as the inside of the bead portions 20.

The tread rubber 16, serving as a tread layer, is vulcanization bonded to the covering rubber layer 14. The tread rubber 16 is positioned at the tire radial direction outside of the crown portion 26 of the tire frame member 12, and employs a similar rubber to tread rubber employed in conventional, general rubber pneumatic tires, or tread rubber employed in recycled tires. Water drainage grooves 16A are formed extending around the tire circumferential direction in a tread face of the tread rubber 16. Note that in the present exemplary embodiment, two grooves 16A are formed; however, configuration is not limited thereto, and more grooves 16A may be formed. Grooves that slope with respect to the tire circumferential direction may also be formed. A known tread pattern is employed as a tread pattern.

The reinforcing belt layer 18 is adhered to a face (inner circumferential face) of the crown portion 26 of the tire frame member 12 at the opposite side to the tread rubber 16. The reinforcing belt layer 18 is an elongated shaped belt layer formed around the circumference of the inner circumferential face of the tire frame member 12, and is positioned at the tire axial direction center portion thereof.

Note that the reinforcing belt layer 18 of the present exemplary embodiment is formed by covering a cord with resin; however, configuration is not limited thereto, and a cord may be covered with rubber. When formed by covering a cord with resin, a welding method employing thermoplastic resin or melted resin, or an adhesion method employing adhesive, may be employed as a method of adhering the reinforcing belt layer 18 and the tire frame member 12 together. When formed by covering a cord with rubber, methods such as bladder vulcanization in which vulcanization is performed using a bladder, bladderless vulcanization in which vulcanization is performed without a bladder, core vulcanization employing a rigid core, or the like may be employed as a method of adhering the reinforcing belt layer 18 and the tire frame member 12 together.

A monofilament, a collective body of plural filaments, or a twisted cord may be employed as the cord of the reinforcing belt layer 18. Plural cords may be arranged, or woven in fabric form. Organic fibers (nylon, PET, glass, aramid) or a metal such as steel, may be applied as the cord material. In cases in which the reinforcing belt layer 18 is formed by covering a cord with resin, one side of the cord may be covered with resin, or both sides of the cord may be covered with resin.

The reinforcing belt layer 18 of the present exemplary embodiment is formed with a tire axial direction length (width) of 35 mm; however; configuration is not limited thereto, and may be changed as appropriate according to the size and shape of the tire 10. The reinforcing belt layer 18 is preferably formed with a width of 20 mm or above, from the perspective of securing rigidity.

Figure 2:
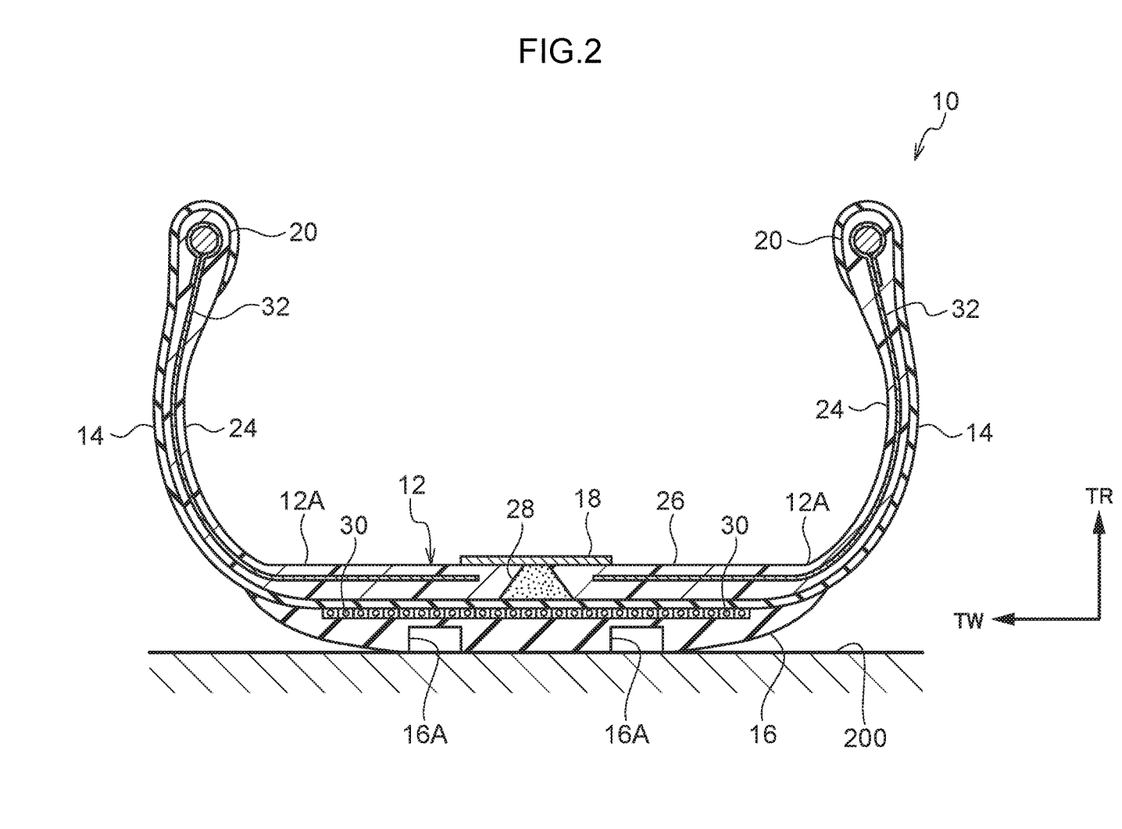
FIG. 2 is a cross-section illustrating one side of a cross-section along the tire axial direction of a tire according to the first exemplary embodiment.

As illustrated in FIG. 2, the reinforcing belt layer 18 covers a joint portion of the tire frame member 12 where the joint member 28 is provided. When the reinforcing belt layer 18 is projected along the tire radial direction, both width direction end portions of the reinforcing belt layer 18 overlap in the tire radial direction the end portions of the side reinforcing members 32 embedded in the tire frame member 12. Overlapping the reinforcing belt layer 18 and the side reinforcing members 32 in the tire radial direction in this manner enables stress acting in the tire radial direction to be borne by at least one out of the reinforcing belt layer 18 or the side reinforcing members 32. This enables low rigidity portions to be eliminated; however, configuration is not limited thereto, and the reinforcing belt layer 18 and the side reinforcing members 32 may be disposed without overlapping each other in the tire radial direction.

In the present exemplary embodiment, the rigidity is increased by extending the side reinforcing members 32 as far as the tire axial direction center portion of the tire frame member 12; however, configuration is not limited thereto, and as long as the side reinforcing members 32 are disposed at the side portions 24, extension as far as the crown portion 26 is not required.

Operation and Advantageous Effects

Explanation follows regarding operation and advantageous effects of the tire 10 according to the present exemplary embodiment. In the tire 10 according to the present exemplary embodiment, the side reinforcing members 32 are embedded in the respective side portions 24 of the tire frame member 12 formed of resin material, thereby enabling the rigidity of the side portions 24 to be increased. This enables the occurrence of a phenomenon (pinch cut) in which the side portions 24 deform, and the side portions 24 become wedged between a protrusion on a road surface 200 and the rim to be suppressed.

The side reinforcing members 32 extend as far as the crown portion 26, and the reinforcing cord 30 is embedded in the crown portion 26. This enables the rigidity of the crown portion 26 in the tire radial direction to be increased. In the tire frame member 12 of the present exemplary embodiment, the pair of tire pieces 12A are formed coupled together by the resin joint member 28. This enables the joint strength to be increased, compared to cases in which adhesion is performed by adhesive or the like instead of resin. The reinforcing belt layer 18 is adhered to the crown portion 26 of the tire frame member 12 so as to cover the joint member 28. This enables the joint portion, which is more liable to deform than other portions, to be reinforced.

Explanation follows regarding operation in which the above joint portion can be reinforced, with reference to the drawings. As illustrated in FIG. 2, when the tire 10 is in ground contact with the road surface 200, the weight of the vehicle acts on the tire 10, such that the crown portion 26 and the tread rubber 16 of the tire frame member 12 are in a state pressed against the road surface.

Figure 3:
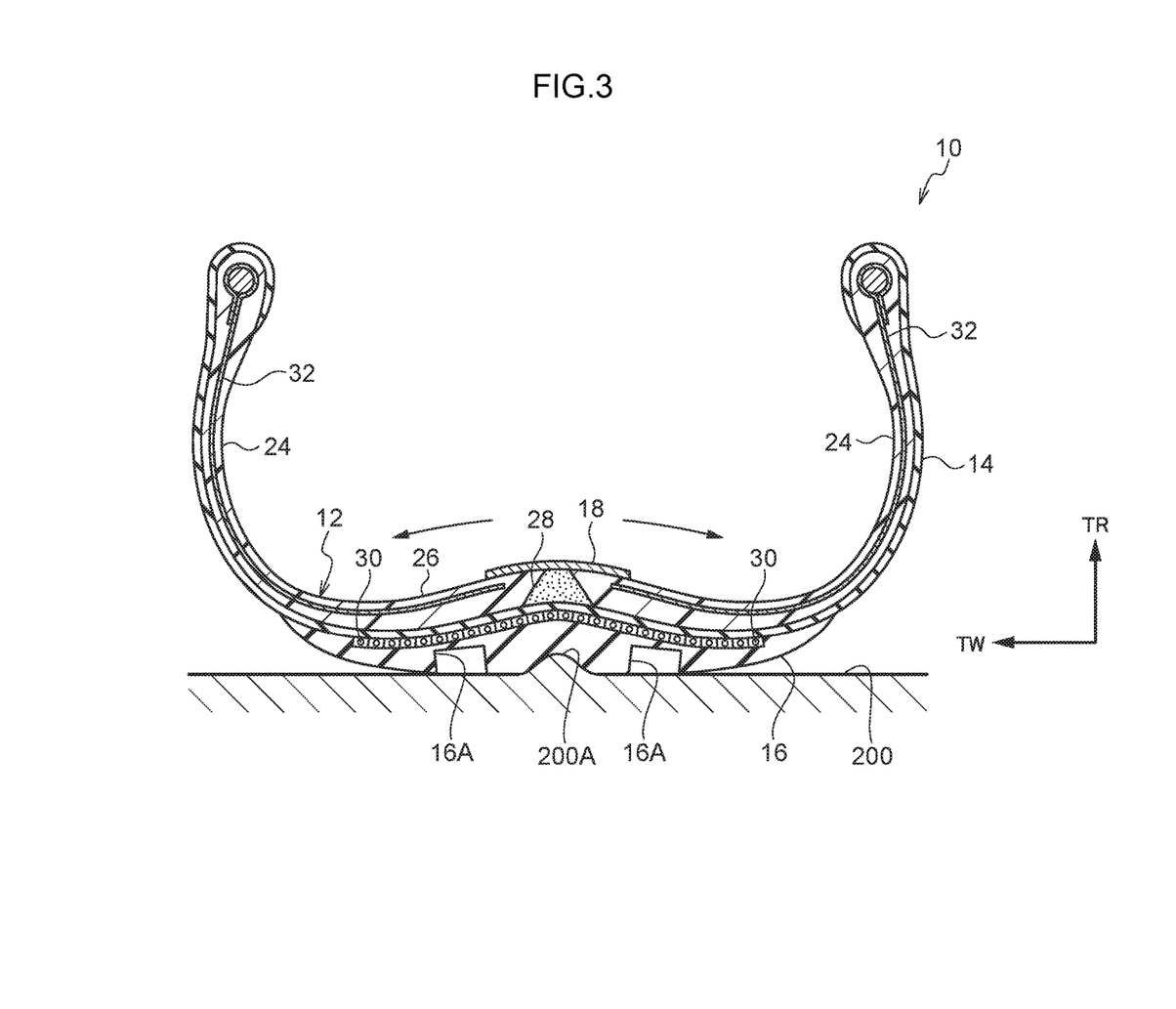
FIG. 3 is a cross-section illustrating one side of a cross-section along the tire axial direction, in a state in which a tire according to the first exemplary embodiment has ridden up over a protrusion on a road surface.

As illustrated in FIG. 3, when the tire 10 rides up over a protrusion 200A on the road surface 200, the tread rubber 16 is pressed upward by the protrusion 200A, and stress in the tire radial direction acts on the crown portion 26 of the tire frame member 12. Note that in FIG. 3, illustration of the deformation of the tire 10 is exaggerated for ease of explanation.

When stress in the tire radial direction acts on the crown portion 26, compression stress acts on the tire radial direction outside of the joint portion, and tensile stress illustrated by the arrows occurs at a tire radial direction inside face of the tire frame member 12. Note that the reinforcing belt layer 18 is adhered to the tire radial direction inside of the tire frame member 12, such that the joint portion is reinforced and rigidity is increased. This enables deformation of the tire frame member 12 to be suppressed, even when tensile stress acts on the joint portion. In the present exemplary embodiment, both the width direction end portions of the reinforcing belt layer 18 and the side reinforcing members 32 overlap each other in the tire radial direction, such that the entire crown portion 26 is reinforced, enabling deformation of the crown portion 26 to be suppressed.

In the present exemplary embodiment, the pair of tire pieces 12A are joined together to form the tire frame member 12; however, configuration is not limited thereto, and three or more tire pieces 12A may be joined together to form the tire frame member 12. In such cases, reinforcing belt layers 18 may be respectively provided at joint portions of adjacent tire pieces 12A.

Second Exemplary Embodiment

Figure 4:
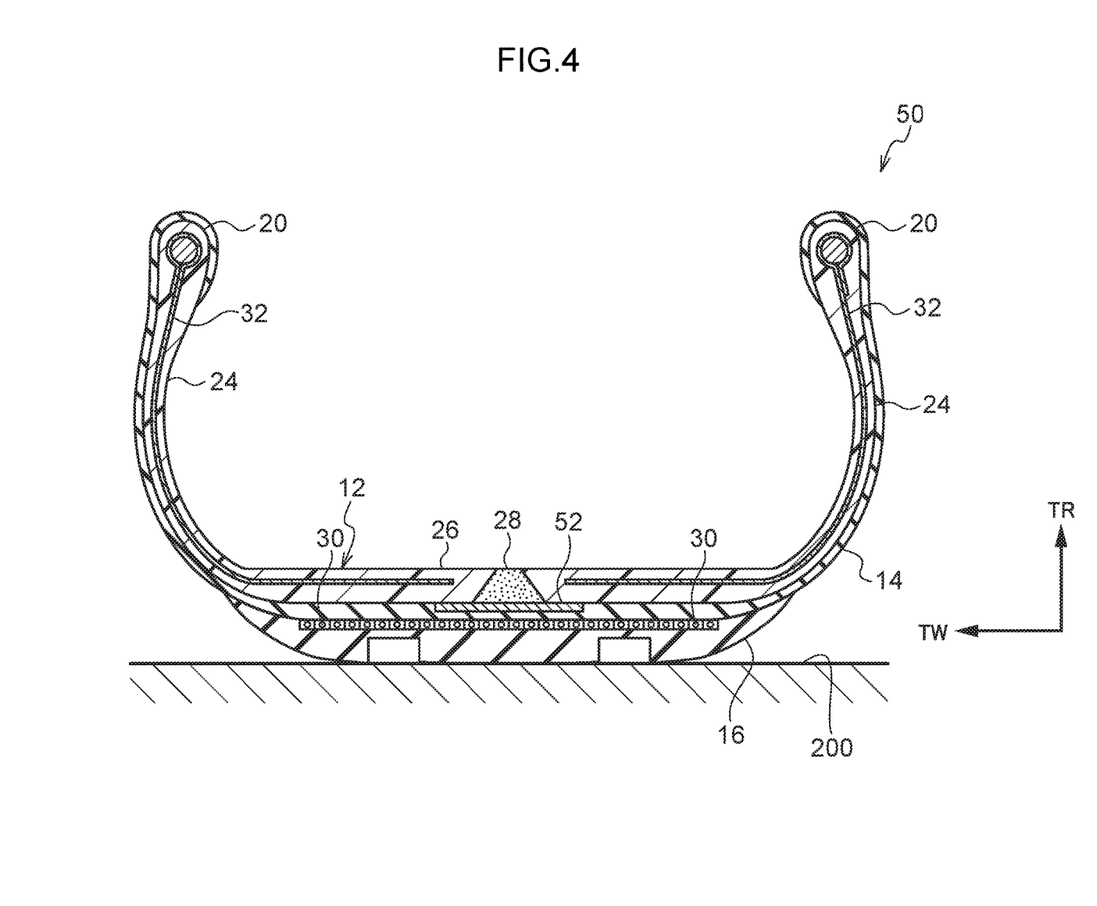
FIG. 4 is a cross-section illustrating one side of a cross-section along the tire axial direction of a tire according to a second exemplary embodiment.

Explanation follows regarding a tire 50 according to a second exemplary embodiment of the present invention. Note that similar configuration to the first exemplary embodiment is appended with the same reference numerals, and explanation thereof is omitted. As illustrated in FIG. 4, the tire 50 of the present exemplary embodiment is provided with the tire frame member 12 including the bead portions 20, the side portions 24, and the crown portion 26, similarly to in the first exemplary embodiment.

A reinforcing belt layer 52 is adhered to the tire radial direction outside face of the tire frame member 12. The reinforcing belt layer 52 is formed by covering a cord with resin, and covers the joint member 28 from the tire radial direction outside. The reinforcing belt layer 52 may be formed by covering a cord with rubber. The cord of the reinforcing belt layer 52 may be a monofilament, a collective body of plural filaments, or a twisted cord. Plural of the cords may be arranged, or woven into a fabric form. Organic fibers (nylon, PET, glass, aramid), or a metal such as steel may be applied as the cord material.

Note that both width direction end portions of the reinforcing belt layer 52 overlap the side reinforcing members 32 in the tire radial direction. The reinforcing belt layer 52 is covered by the covering rubber layer 14, and the tread rubber 16 is provided at the tire radial direction outside of the covering rubber layer 14.

In the tire 50 of the present exemplary embodiment, the reinforcing belt layer 52 is wedged between the tire frame member 12 and the covering rubber layer 14, and so does not peel away from the tire frame member 12. Other operation is similar to in the first exemplary embodiment.

Third Exemplary Embodiment

Figure 5:
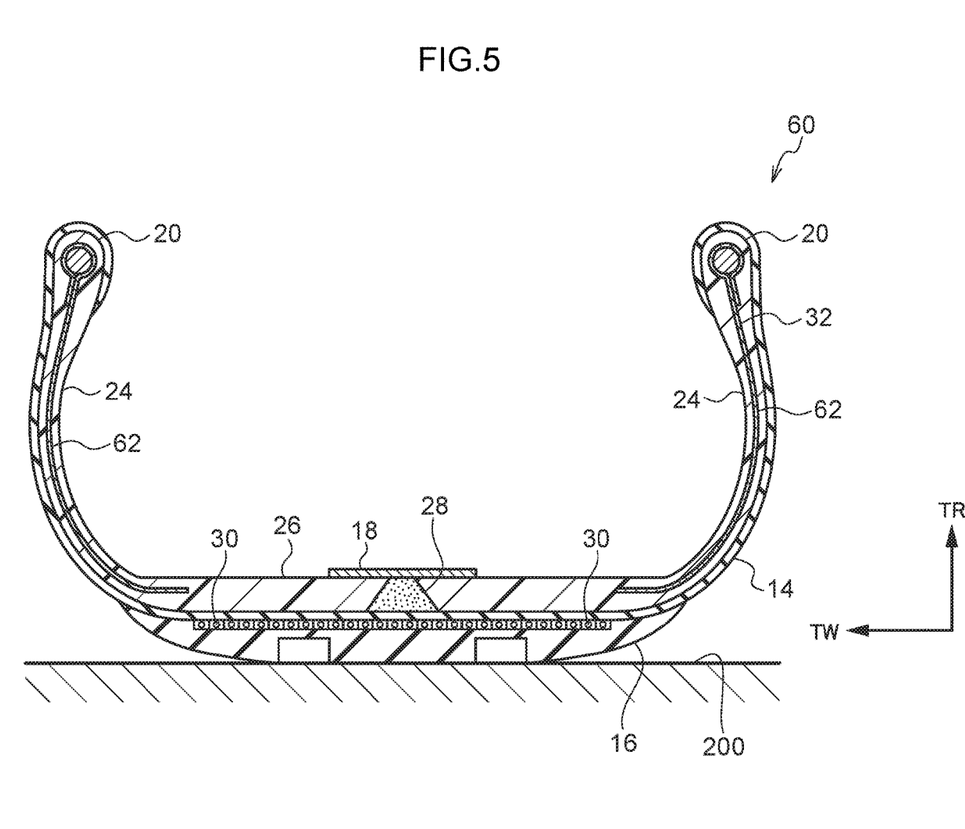
FIG. 5 is a cross-section illustrating one side of a cross-section along the tire axial direction of a tire according to a third exemplary embodiment.

Explanation follows regarding a tire 60 according to a third exemplary embodiment of the present invention. Note that similar configuration to the first exemplary embodiment is appended with the same reference numerals, and explanation thereof is omitted. As illustrated in FIG. 5, side reinforcing members 62 embedded in the tire frame member 12 of the present exemplary embodiment are formed with a shorter length than the side reinforcing members 32 of the first exemplary embodiment. Namely, the side reinforcing members 62 of the present exemplary embodiment extend from the bead portions 20 to the vicinity of shoulder portions, and are not formed to the crown portion 26.

The tire 60 of the present exemplary embodiment is embedded with the side reinforcing members 62 that have the necessary length to secure rigidity, thereby enabling the embedding process of the side reinforcing members 62 to be more easily performed than that in the tire 10 of the first exemplary embodiment. Making the length of the side reinforcing members 62 shorter enables the material cost to be reduced. Other operation is similar to that in the first exemplary embodiment.

The first to third exemplary embodiments of the present invention have been explained above; however, the present invention is not limited to these exemplary embodiments, and obviously various embodiments may implemented within a range not departing from the spirit of the present invention. For example, the first exemplary embodiment and the second exemplary embodiment may be combined, and reinforcing belt layers 18 adhered to both tire radial direction faces of the tire frame member 12.

The disclosure of Japanese Patent Application No. 2013-146822, filed on Jul. 12, 2013, is incorporated in its entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. A tire comprising:
   a ring shaped tire frame member that is made of a resin with a plurality of tire pieces, the plurality of tire pieces being adjacent to each other in a tire axial direction and being joined along a tire circumferential direction;
   a joint portion reinforcing belt that is adhered to the tire frame member, that extends around the tire circumferential direction, and that covers a joint portion of the tire pieces; and
   a tread layer that is provided at a tire radial direction outside of the tire frame member and the joint portion reinforcing belt; wherein:
   the tire frame member includes a pair of bead portions, a pair of side portions that extend from the pair of bead portions toward the tire radial direction outside and that are disposed around the tire circumferential direction, and a crown portion that couples the pair of side portions together; and
   side reinforcing members that are embedded in the side portions at intervals around the tire circumferential direction so as to intersect the tire circumferential direction on progression from the bead portions toward the crown portion.

2. The tire of claim 1, wherein the joint portion reinforcing belt is provided at the tire radial direction inside of the tire frame member.

3. The tire of claim 1, wherein:
   facing end faces of the plurality of tire pieces are joined together by a joint member made of resin; and
   the joint portion reinforcing belt covers the joint member from the tire radial direction outside.

4. The tire of claim 1, wherein:
   the side reinforcing members extend as far as a tire axial direction center portion; and
   when the joint portion reinforcing belt is projected along the tire radial direction, both width direction end portions of the joint portion reinforcing belt overlap the side reinforcing members.

* * * * *